(12) United States Patent
Nelson et al.

(10) Patent No.: US 10,236,712 B2
(45) Date of Patent: Mar. 19, 2019

(54) DUAL-DISTRIBUTION LIGHTING DEVICE FOR LIGHTING SYSTEMS

(71) Applicant: ABL IP Holding LLC, Atlanta, GA (US)

(72) Inventors: Kenneth Edwin Nelson, Stone Mountain, GA (US); Michael G. Hanley, Lawrenceville, GA (US); Dale R. Bowles, Jr., Atlanta, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 15/813,228

(22) Filed: Nov. 15, 2017

(65) Prior Publication Data

US 2018/0145536 A1 May 24, 2018

Related U.S. Application Data

(60) Provisional application No. 62/423,874, filed on Nov. 18, 2016.

(51) Int. Cl.
*H02J 9/02* (2006.01)
*F21V 23/04* (2006.01)
*H02J 9/06* (2006.01)
*F21W 131/407* (2006.01)
(Continued)

(52) U.S. Cl.
CPC ............ *H02J 9/02* (2013.01); *F21V 23/0435* (2013.01); *F21V 23/0457* (2013.01); *H02J 9/06* (2013.01); *H02J 9/065* (2013.01); *F21S 9/02* (2013.01); *F21V 23/0464* (2013.01); *F21W 2131/407* (2013.01); *F21Y 2113/00* (2013.01)

(58) Field of Classification Search
CPC .... H05B 37/0227; F21L 4/02; F21V 23/0414; F21V 23/0471
USPC .......................................................... 315/86
See application file for complete search history.

(56) References Cited

U.S. PATENT DOCUMENTS 6,538,568 B2 3/2003 Conley, III
7,940,010 B2 5/2011 Patterson
(Continued)

OTHER PUBLICATIONS

Cooper Automated Lighting, "Emergency Lighting Design Guide," available online at http://www.iar.unicamp.br/lab/luz/ld/Seguran% E7a/emergency_lighting_design_guide.pdf, pp. 441-451.
(Continued)

*Primary Examiner* — Daniel D Chang
(74) *Attorney, Agent, or Firm* — Kilpatrick Townsend & Stockton LLP (57) ABSTRACT

Aspects are described for dual-distribution lighting devices. For example, a dual-distribution lighting device includes a forward-throw module with a first lighting element that can provide directional light, a wide-throw module with a second lighting element that can provide light with a wide distribution, an interface element that can to receive input, and a processing device. In response to the input being received via the interface element, the processing device deactivates one of the forward-throw and wide-throw modules and activates the other of the forward-throw and wide-throw modules, thereby causing the dual-distribution lighting device to switch between providing directional light and a wide distribution of light.

20 Claims, 5 Drawing Sheets

(51) Int. Cl.
   *F21S 9/02*       (2006.01)
   *F21Y 113/00*     (2016.01)

(56) References Cited

U.S. PATENT DOCUMENTS

| | | | | |
|---|---|---|---|---|
| 7,994,725 | B2* | 8/2011 | Bouchard | H05B 33/0818 |
| | | | | 315/122 |
| 9,609,722 | B2* | 3/2017 | Law | H05B 37/0227 |
| 2005/0227672 | A1* | 10/2005 | Lauzon | G08B 3/1091 |
| | | | | 455/412.2 |
| 2014/0070700 | A1* | 3/2014 | Genthon | H05B 33/0854 |
| | | | | 315/83 |
| 2015/0195883 | A1* | 7/2015 | Harris | H05B 33/0845 |
| | | | | 315/155 |
| 2016/0105986 | A1 | 4/2016 | Ledezma et al. | |

OTHER PUBLICATIONS

Engineering Project Group, "Emergency Lighting: A Best Practice Guide," Consortium Local Authorities Wales, Mar. 2011, 14 pages.
Primex Wireless, "Application Management Platform (AMP), Emergency Lights Module, User Guide," Primex Wireless, Inc., Apr. 10, 2014, 56 pages.
Thomas & Betts, "Emergency Lighting Guide: An authoritative guide to emergency lighting systems and design techniques," available online at http://www-public.tnb.com/eel/docs/emergilite/Emergi-Lite_Emergency_Lighting_Design_Guide.pdf, 2013, 84 pages.
CA 2,985,580, "Office Action," dated Sep. 17, 2018, 5 pages.

\* cited by examiner

DUAL-DISTRIBUTION LIGHTING DEVICE FOR LIGHTING SYSTEMS

CROSS-REFERENCE TO RELATED APPLICATIONS

This application claims priority to U.S. Provisional Application Ser. No. 62/423,874 filed Nov. 18, 2016 and titled "Dual-Distribution Lighting Device for Lighting Systems," the contents of which are hereby incorporated by reference.

TECHNICAL FIELD

This disclosure relates generally to lighting devices, and more particularly relates to a dual-distribution lighting device that can be switched between a forward-throw lighting distribution and a wide-throw lighting distribution.

BACKGROUND

Emergency lighting systems can provide egress lighting if a power supply to a building or other structure is interrupted or fails. In some emergency lighting systems, a forward-throw lighting distribution is desirable. For instance, a forward-throw light distribution can provide a sharp cut-off and can be used for lighting a door frame, a perimeter, or other concentrated area in a location serviced by an emergency lighting system. In other emergency lighting systems, a wide-throw lighting distribution is desirable. For instance, a wide-throw light distribution can provide an even distribution of light in an area surrounding the light fixture. In an emergency lighting system, the wide-throw light distribution can be used to illuminate paths of egress.

Installing an emergency lighting system may require identifying requirements for lighting distributions and installing equipment that satisfies those requirements.

Current solutions involve installing a lighting fixture that is configured to provide only one type of lighting distribution. For instance, a lighting fixture may be configured to provide only a wide-throw distribution or only a forward-throw distribution.

In some cases, the same set of lighting elements in a lighting fixture can be mechanically repositioned to provide a wide-throw distribution or a forward-throw distribution. But doing so may provide sub-optimal coverage with respect to one or more of the distributions (e.g., insufficient illumination to meet regulatory requirements for one of the distributions).

SUMMARY

Examples described herein disclose dual-distribution lighting devices and methods of operating dual-distribution lighting devices. In some aspects, a dual-distribution lighting device includes a forward-throw module having a first lighting element that can provide directional light, a wide-throw module having a second lighting element that can provide a wide distribution of light, an interface element that can receive input, and a processing device. The processing device can respond to the input being received by performing various operations. In some aspects, these operations include deactivating the forward-throw module of the light fixture and thereby causing the first lighting element to cease providing the directional light, and activating the wide-throw module and thereby causing the second lighting element to provide the wide distribution of light. In other aspects, these operations include deactivating the wide-throw module and thereby causing the second lighting element to cease providing the wide distribution of light, and activating the forward-throw module of the dual-distribution lighting device and thereby causing the first lighting element to provide the directional light.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As discussed, existing solutions do not provide configurable lighting systems configurable for multiple light distributions without requiring mechanical adjustment. More specifically, certain aspects disclosed herein involve a dual-distribution lighting device that can be switched between a forward-throw configuration and a wide-throw configuration. In the forward-throw configuration, the dual-distribution lighting device emits light in a concentrated outward direction from the lighting fixture, where the amount of light falling behind the lighting fixture is reduced. In the wide-throw configuration, the dual-distribution lighting device emits light in multiple directions away from the lighting fixture.

The dual-distribution lighting device can be switched between the forward-throw configuration and the wide-throw configuration via electrical signals generated using one or more interface elements on the dual-distribution lighting device. In one example, an interface element can be a button or test switch on the housing of the dual-distribution lighting device. Pressing the button can cause a signal or other electrical input to be detected by the processing device in the dual-distribution lighting device. If the processing device determines that the button has been pressed for a defined amount of time (e.g., at least twenty seconds) or a certain number of times in a period (e.g., ten times in a thirty-second period), the processing device configures certain lighting control circuitry of the dual-distribution lighting device to switch between the forward-throw configuration and the wide-throw configuration. In some aspects, the lighting fixture can also include a multi-mode configuration in which both a forward-throw distribution and a wide-throw distribution are provided simultaneously.

Figure 1:
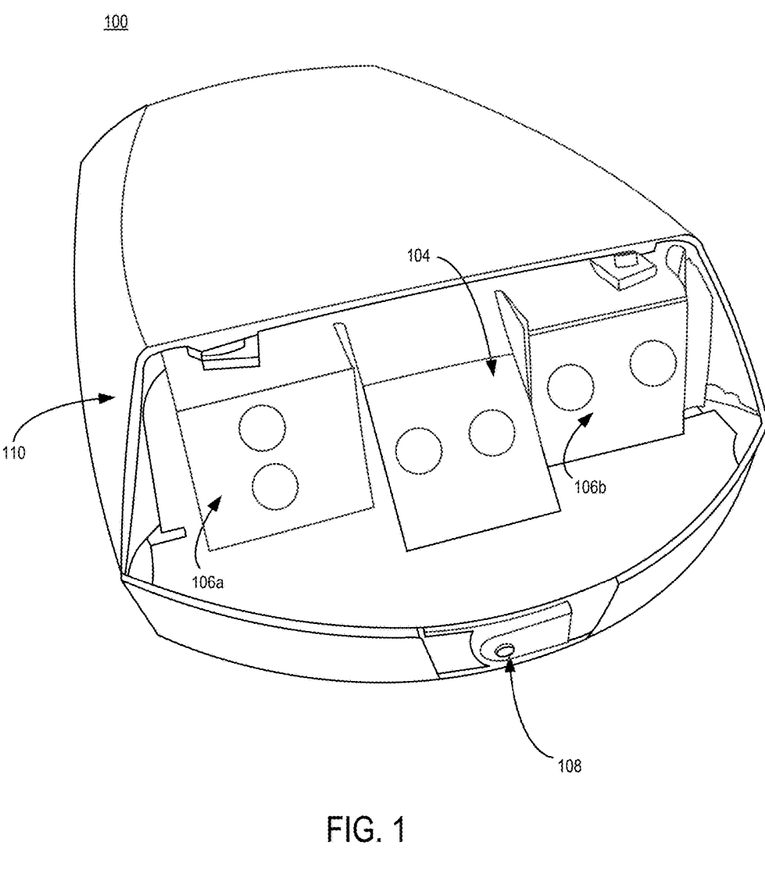
FIG. 1 depicts an example of a dual-distribution lighting device, according to certain aspects of the present disclosure.

FIG. 1 depicts an example of a dual-distribution lighting device, according to certain aspects of the present disclosure. Dual-distribution lighting device 100 includes a forward-throw module 104 and wide-throw modules 106a and 106b. Different numbers of forward-throw modules and wide-throw modules are possible. For example, a dual-distribution lighting device may contain two forward throw modules and two wide-throw modules.

The forward-throw module 104 and the wide-throw modules 106a and 106b are positioned within a housing 110 of the dual-distribution lighting device 100. The forward-throw module 104 can be positioned between the wide-throw modules 106a and 106b, or at a different location. Each of the wide-throw modules 106a and 106b includes one or more lighting elements suitable for providing a wide-throw distribution of light. Each of the wide-throw modules 106a and 106b also includes circuitry for providing power to the lighting elements. The forward-throw module 104 includes one or more lighting elements suitable for providing a forward-throw distribution of light. The forward-throw module 104 also includes circuitry for providing power to the lighting elements.

In some aspects, the dual-distribution lighting device can be manufactured to meet certain regulatory requirements. For example, the dual-distribution lighting device 100 can be manufactured by selecting certain types of lighting elements for the forward-throw module 104 and the wide-throw modules 106a and 106b and certain positions for the forward-throw module 104 and the wide-throw modules 106a and 106b. The selected lighting elements and positions allow the dual-distribution lighting device 100 to provide each of the forward-throw distribution and the wide-throw distribution. For instance, certain regulatory requirements may be imposed on the forward-throw distribution and the wide-throw distribution (e.g., number of foot-candles of light at any spot in the distribution, average number of foot-candles throughout the distribution, min-to-max ratio of the minimum foot-candle value and the maximum foot-candle value, etc.). An improper selection of lighting elements, an improper positioning of the forward-throw module and the wide-throw modules, or both can prevent the dual-distribution lighting device 100 from meeting these regulatory requirements. Thus, when manufacturing the dual-distribution lighting device 100, a combination of lighting element types and lighting element positions can be selected such that the forward-throw distribution meets regulatory requirements without preventing the wide-throw distribution from meeting regulatory requirements. In some aspects, the lighting element types and positions can be selected so that the dual-distribution light fixture can be switched between the wide-throw distribution, the forward-throw distribution, and a configuration in which a forward-throw distribution and a wide-throw distribution are provided simultaneously.

Figure 3:
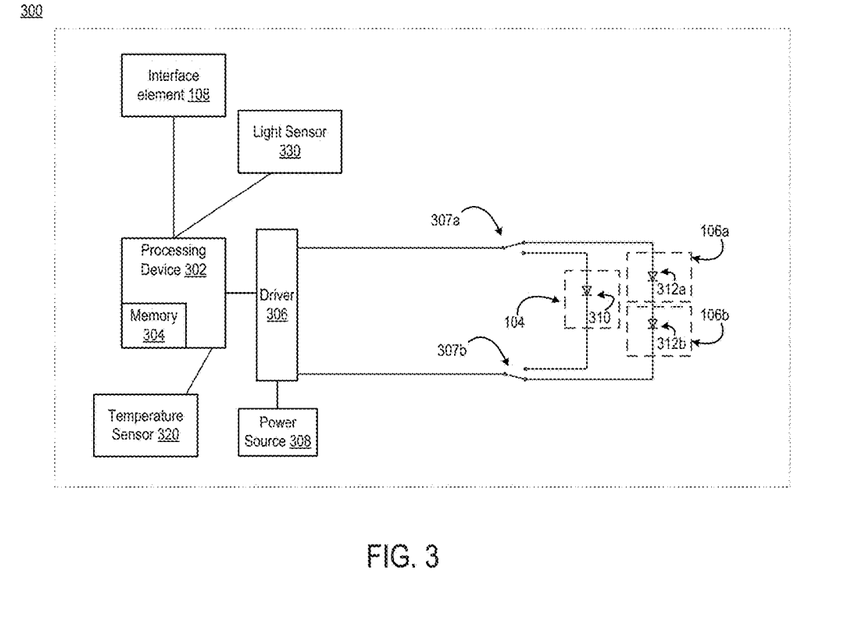
FIG. 3 is a block diagram depicting certain components of an example of a dual-distribution lighting device, according to certain aspects of the present disclosure.
Figure 4:
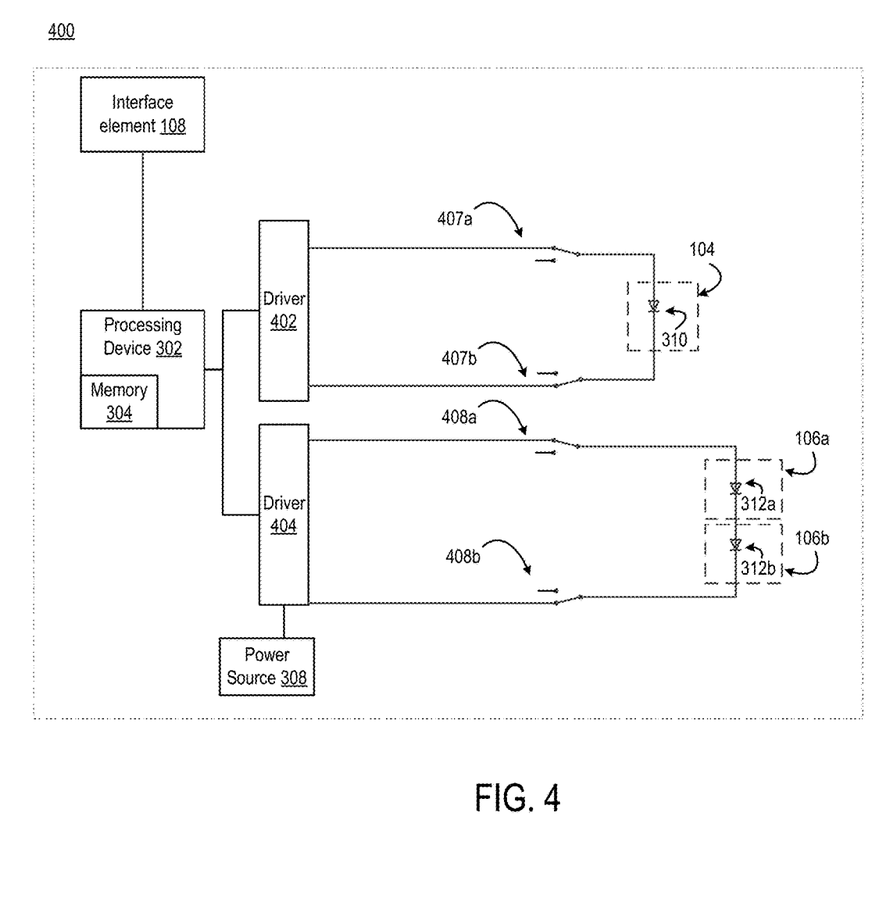
FIG. 4 is a block diagram depicting certain components of an example of a dual-distribution lighting device, according to certain aspects of the present disclosure.

Dual-distribution lighting device 100 also includes an interface element 108. The interface element 108 can include one or more devices, mechanisms, or some combination thereof that can provide a signal or other electrical input to processing device of the dual-distribution lighting device, as described in greater detail with respect to FIG. 3. In some aspects, the interface element 108 is a push-button, as depicted in FIGS. 3-4. In additional or alternative aspects, an interface element of a dual-distribution lighting device can include an infrared sensor, a wireless transceiver, a test switch, or any other suitable device or mechanism that can be used to provide an electrical or communicative input to the processing device.

Figure 2:
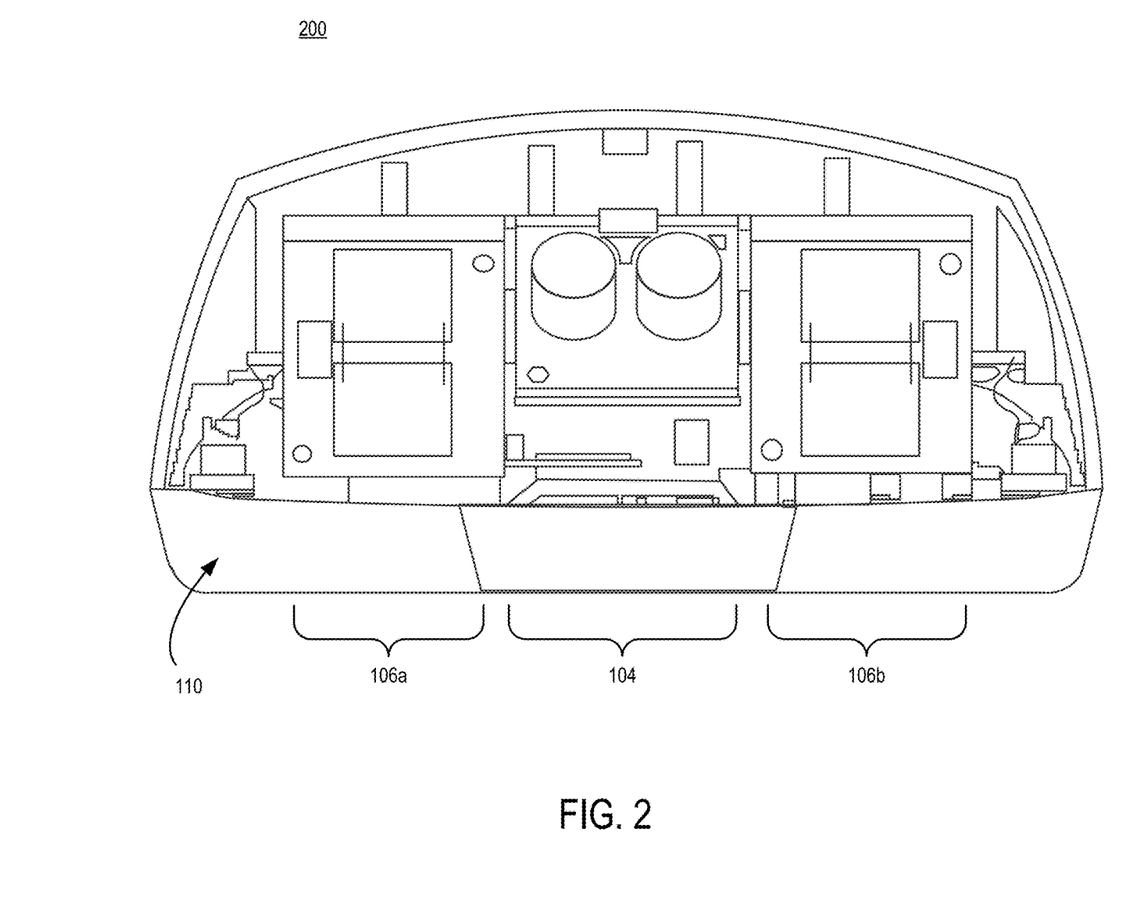
FIG. 2 depicts an alternative view of a dual-distribution lighting device, according to certain aspects of the present disclosure.

FIG. 2 depicts an alternative view of a dual-distribution lighting device, according to certain aspects of the present disclosure. Lighting device 200 shows the housing 110, wide-throw modules 106a and 106b, and forward-throw module 104.

FIG. 3 is a block diagram depicting certain components of an example of a dual-distribution lighting device, according to certain aspects of the present disclosure. In this example, dual-distribution lighting device 300 includes a processing device 302, a memory 304, a driver 306, switching elements 307a and 307b, a power source 308, and lighting elements 310, 312a, and 312b.

The processing device 302 can include any suitable device or group of devices configured to execute code stored on a computer-readable medium. Examples of processing device include processor, a microprocessor, a mixed signal microcontroller, an application-specific integrated circuit ("ASIC"), a field-programmable gate array ("FPGA"), or another suitable processing device. The processing device can be communicatively coupled to other components of the emergency lighting fixture via a bus, a printed circuit board, or any other suitable structure or device (not illustrated in FIG. 3).

The memory 304 can include any suitable non-volatile memory device. An example of the memory 304 is an electrically erasable programmable read-only memory ("EEPROM") device.

The driver 306 can include one or more devices, components, or combinations thereof that can control the power provided to a lighting element. A non-limiting example of a lighting element is a light-emitting diode or a group of light-emitting diodes. The driver 306 can be electrically coupled to lighting elements 310, 312a, and 312b via switching elements 307a and 307b. Examples of switching elements include relays, MOSFETs, or any other suitable switching components or devices.

The processing device 302 can control operations of the driver 306. Controlling the driver 306 can cause different amounts of power to be provided from the power source 308 (e.g., a battery, a connection to an external power supply, etc.) to a forward-throw lighting element 310, which is included in the forward-throw module 104, and/or the wide-throw lighting elements 312a and 312b, which are respectively included in the wide-throw modules 106a and 106b. The processing device 302 can also be used to control switching circuitry (which is omitted from FIG. 3 for simplicity of illustration) for operating switching elements 307a and 307b. In the forward-throw configuration, the switching elements 307a and 307b can electrically couple the driver 306 to the lighting element 310. In the wide-throw configuration, the switching elements 307a and 307b can electrically couple the driver 306 to the wide-throw lighting elements 312a and 312b.

The processing device 302 can be electrically coupled or communicatively coupled to the interface element 108. The processing device 302 can receive one or more electrical inputs from the interface element 108, such as a button or test switch. For instance, the processing device 302 can detect one or more button presses of a button that is used as the interface element 108 or a button press of a certain duration. The processing device 302 can execute suitable program code, which may be stored in the memory 304 or another suitable non-transitory computer-readable medium (not shown), to count the number of button presses within a specified time period or to determine the duration of a given button press. If the counted number of button presses within a specified time period exceeds a threshold number or the duration of button press exceeds a specified duration, the processing device 302 can switch the dual-distribution lighting device 300 between a forward-throw configuration and a wide-throw configuration. In some aspects, a first number of button presses or a first duration can be used to specify the forward-throw configuration and a second, different number of button presses or a second, different duration can be used to specify the wide-throw configuration. In other aspects, a specific number of button presses or a specific duration can be used to indicate that the dual-distribution lighting device 300 should toggle between a current configuration (e.g., a current forward-throw configuration) and another configuration (e.g., a wide-throw configuration).

In additional or alternative aspects, other electrical inputs can be provided to the processing device 302. For example, an interface element 108 can include a transceiver or other communication interface, such as an interface for receiving serial commands from a gateway or other external device. The commands or other signals received via the communication interface can be provided to the processing device 302. The processing device 302 can switch between a forward-throw configuration and a wide-throw configuration based on the commands or other signals.

Switching the dual-distribution lighting device 300 between a forward-throw configuration and a wide-throw configuration can include accessing data in the memory 304 that identifies configuration parameters for the different configurations. For example, a configuration parameter may be a duty cycle used by the driver 306. The memory 304 can store a first duty cycle value for the forward-throw configuration. The memory 304 can also store a second duty cycle value for the wide-throw configuration. If the processing device 302 determines that the dual-distribution lighting device 300 should be switched between a forward-throw configuration and a wide-throw configuration, the processing device 302 retrieves the appropriate duty cycle value from the memory 304. The processing device 302 also causes switching circuitry to couple the driver 306 to the lighting element 310 or the wide-throw lighting elements 312a and 312b.

The processing device 302 communicates a control signal to the driver 306 that causes the driver 306 to select the appropriate duty cycle for an amount of power specific to the selected configuration. For instance, the driver 306 can use the first duty cycle to provide a first amount of power from the power source 308 to the lighting element 310 if the dual-distribution lighting device 300 is in the forward-throw configuration. The driver 306 can use the second duty cycle to provide a second amount of power from the power source 308 to the wide-throw lighting elements 312a and 312b if the dual-distribution lighting device 300 is in the wide-throw configuration. For example, a given duty cycle can adjust a driving current to be suitable for a given configuration (e.g., forward-throw configuration, wide-throw configuration, or simultaneous forward-throw configuration and wide-throw configuration).

The lighting elements 310, 312a, and 312b can be selected to provide required lighting distributions. In some aspects, one or more forward-throw lighting elements 310 can be different from the wide-throw lighting elements 312a and 312b based on which types of lighting elements are better suited to providing a desired forward-throw distribution and wide-throw distribution. In other aspects, the same types of lighting elements can be used for both the lighting element 310 and the wide-throw lighting elements 312a and 312b, In some aspects, the memory 304 can store a current configuration of the dual-distribution lighting device 300. For example, switching from a forward-throw configuration to a wide-throw configuration (or vice versa) can involve setting the value of a flag or other variable stored in the memory 304 to a value indicating the current configuration of the dual-distribution lighting device 300. The flag or other variable can be used to maintain the configuration of the dual-distribution lighting device 300 in the event of a power failure in the dual-distribution lighting device 300 itself (e.g., a failed battery).

Any suitable power source 308 can be used for the dual-distribution lighting device 300. In some aspects, the power source 308 is only a battery. For instance, the dual-distribution lighting device 300 may be configured to operate as an emergency unit only, where the processing device 302 can activate one or more of the forward-throw module 104 and the wide-throw modules 106a and 106b in response to detecting a trigger. One example of a trigger is a power failure. The processing device 302 may detect a power failure using a current-sensing element (not shown in FIG. 2) that is electrically coupled to a power source for a building or other structure in which the dual-distribution lighting device 300 is installed. Another example of a trigger is a detected lighting condition. For instance, the processing device 302 may be communicatively coupled to a light sensor 330 that senses an amount of light in an area in which the dual-distribution lighting device 300 is installed. If the sensed amount of light is below a threshold amount of light, the processing device 302 can activate one or more lighting elements.

In other aspects, the power source 308 includes a battery as well as circuitry for electrically coupling the dual-distribution lighting device 300 to an external power source. For example, in addition to the "emergency" mode described above, the dual-distribution lighting device 300 may be configured with a "normal on" mode for providing lighting under "normal" conditions (e.g., in the absence of a power failure). During the "normal on" mode, the dual-distribution lighting device 300 can operate using the external power source. The dual-distribution lighting device 300 can activate the forward-throw module 104, one of the wide-throw modules 106a and 106b, or some combination thereof to maximize or otherwise increase illumination provided in the "normal on" mode. Power from the external power source can be used to charge the battery. If the dual-distribution lighting device 300 enters an emergency mode in response to a trigger (e.g., one of the triggers identified above), the dual-distribution lighting device 300 can power one or more lighting elements from the battery. In some aspects, the dual-distribution lighting device 300 can include one or more temperature sensors 320 that measure a temperature at or near the battery. If the temperature exceeds a threshold temperature, the dual-distribution lighting device 100 can disable the "normal on" mode, and can operate as an emergency unit only (e.g., activating lighting elements in response to the detection of a trigger).

The implementation depicted in FIG. 3 is provided for illustrative purposes. Other implementations can be used that allow a dual-distribution lighting device to switch between a forward-throw configuration and a wide-throw configuration.

FIG. 4 is a block diagram depicting certain components of an example of a dual-distribution lighting device, according to certain aspects of the present disclosure. In this example dual-distribution lighting device 400, a first driver 402 is used for the forward-throw module 104 and a second driver 404 is used for the wide-throw modules 106a and 106b. (Commonly-depicted components in FIGS. 3 and 4 can perform the same or similar functions and involve the same or similar implementations, unless otherwise noted.)

If the processing device 302 detects a suitable electrical input (e.g., a "toggle" sequence, a sequence selecting a particular configuration, etc.), the processing device 302 can activate the first driver 402 or the second driver 404. The first driver 402 or the second driver 404 can be configured to use a duty cycle that is appropriate for the forward-throw module 104 or wide-throw modules 106a and 106b. The processing device 302 can also cause appropriate switching circuitry (e.g., the switching elements depicted in FIG. 3) to electrically couple or de-couple one of the drivers from its module if the other driver and its module is active. For example, in the forward-throw configuration, switching elements 407a and 407b can electrically couple the first driver 402 to the lighting element 310 of the forward-throw module 104a and switching elements 408a and 408b can decouple the second driver 404 from the wide-throw modules 106a and 106b. In the wide-throw configuration, switching elements 407a and 407b can electrically de-couple the first driver 402 from the forward-throw module 104a, switching elements 408a and 408b can electrically couple the second driver 404 can be coupled to the wide-throw lighting elements 312a and 312b of the wide-throw modules 106a and 106b respectively.

Additional or alternative aspects can include other features for implementing the dual-distribution lighting device. In some aspects, a Pulse Width Modulation (PWM) signal can be used to drive a resistor-capacitor (RC) network, and thereby control operation of the forward-throw module 104 and the wide-throw modules 106a and 106b. In other aspects, an analog voltage outputted at a Digital to Analog Converter (DAC) output of the processing device 302 can be used to control operation of a driver or otherwise control operation of the forward-throw module 104 and the wide-throw modules 106a and 106b. In other aspects, a feedback mechanism can be used.

Figure 5:
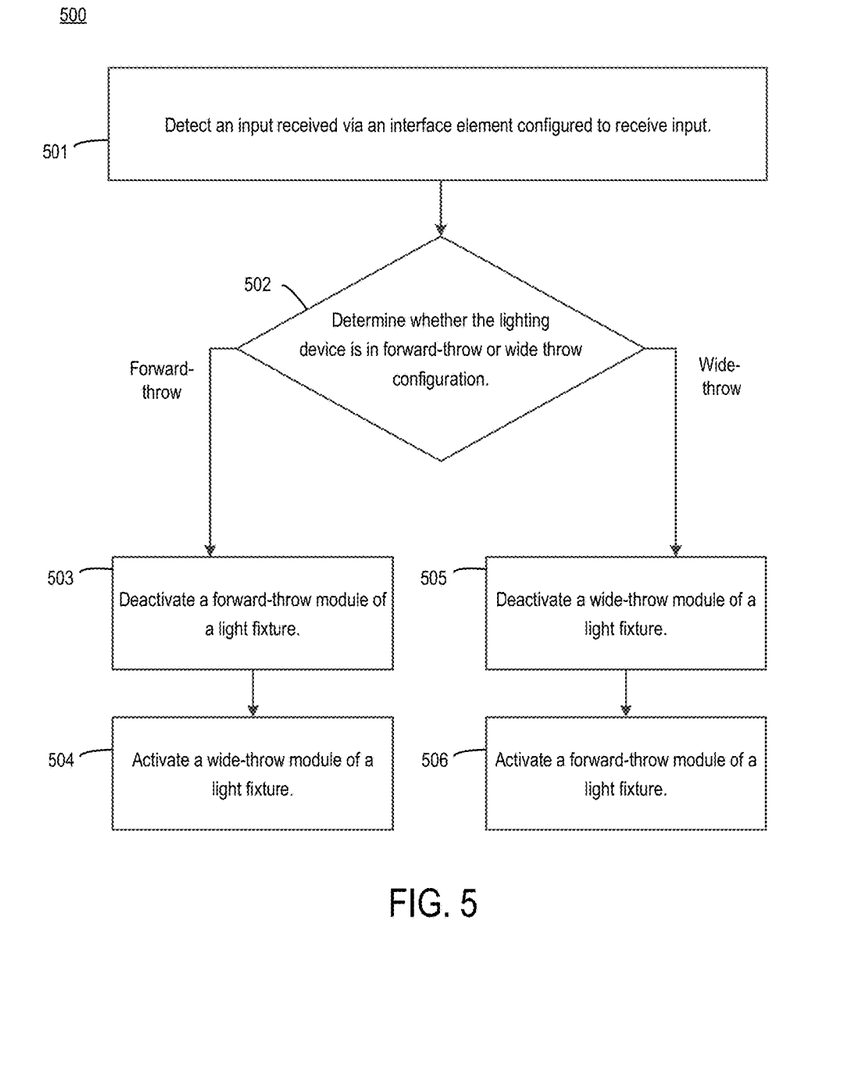
FIG. 5 depicts an example of a process for operation of the dual-distribution lighting device, according to certain aspects of the present disclosure.

FIG. 5 depicts an example of a process for operation of the dual-distribution lighting device, according to certain aspects of the present disclosure.

At block 501, method 500 involves detecting an input received via an interface element configured to receive input. An interface element can be a button on the housing of the lighting device, a signal detected by the processing device in the lighting device, or some other input. For example, the processing device can detect one or more button presses of a button such as interface element 108. In another example, the processing device can detect commands received via an external device.

At block 502, method 500 involves determining whether the lighting device is in forward-throw or wide-throw configuration. Block 502 can be performed responsive to the input being received at block 501. In some aspects, method 500 can switch the light configuration from forward-throw to wide-throw or vice versa. If the processing device 302 determines that the lighting device is in forward-throw configuration, then method 500 continues at block 503. If the processing device 302 determines that the lighting block is in wide-throw configuration, then method 500 continues at block 505.

At block 503, method 500 involves deactivating a forward-throw module of a light fixture. Deactivating a forward-throw module causes the forward-throw lighting element, such as lighting element 310, to cease providing the directional light. For example, processing device 302 can deactivate the forward-throw lighting element 310 by configuring switching elements 307a and 307b to disconnect the circuit between the driver 306 and lighting element 310 enclosed within the forward-throw module 104. Similarly, in a configuration with a first driver 402 and a second driver 404, processing device 302 can configure switching elements 407a and 407b to disconnect the circuit between the first driver 402 and lighting element 310.

At block 504, method 500 involves activating a wide-throw module of the light fixture. Block 504 can be performed responsive to a determination of the configuration of the lighting device at block 502. For example, processing device 302 can activate one or both of the wide-throw lighting elements 310a and 310b by configuring switching elements 307a and 307b to connect the circuit between the driver 306 and wide-throw lighting elements 312a and 312b. Similarly, in a configuration with a first driver 402 and a second driver 404, processing device 302 can configure switching elements 408a and 408b to connect the circuit between the second driver 404 and wide-throw lighting elements 312a and 312b. Following block 504, processing device 302 can continue to perform method 500. For example, processing device 302 can continue to detect additional inputs received by an interface element at block 501, and continue through method 500. In some aspects, block 504 is performed before block 503.

At block 505, method 500 involves deactivating a wide-throw module of a light fixture. Block 505 can be performed responsive to a determination of the configuration of the lighting device at block 502. For example, processing device 302 can deactivate the wide-throw lighting elements 312a and 312b by configuring switching elements 307a and 307b to disconnect the circuit between the driver 306 and wide-throw lighting elements 312a and 312b. Similarly, in a configuration with a first driver 402 and a second driver 404, processing device 302 can configure switching elements 408a and 408b to disconnect the circuit between the second driver 404 and wide-throw lighting elements 312a and 312b.

At block 506, method 500 involves activating a forward-throw module of a light fixture. Activating a forward-throw module causes the forward-throw lighting element, such as forward-throw lighting element 310, to provide the directional light. For example, processing device 302 can activate the forward-throw lighting element 310 by configuring switching elements 307a and 307b to connect the circuit between the driver 306 and forward-throw lighting element 310 enclosed within the forward-throw module 104. Similarly, in a configuration with a first driver 402 and a second driver 404, processing device 302 can configure switching elements 407a and 407b to connect the circuit between the first driver 402 and forward-throw lighting element 310. In some aspects, block 506 is performed before block 505.

Following block 506, processing device 302 can continue to perform method 500. For example, processing device 302 can continue to detect additional inputs received by an interface element at block 501, and continue through method 500. In other aspects, processing device 302 can switch the configuration directly into forward-throw or wide-throw mode from either state or from a configuration in which both forward and wide-throw modules are disabled.

The foregoing is provided for purposes of illustrating, describing, and explaining aspects of this disclosure and is not intended to be exhaustive or limiting to the precise forms disclosed. Further modifications and adaptation of these aspects will be apparent to those skilled in the art and may be made without departing from the scope and spirit of this disclosure. Different arrangements and combinations of the components and functionality described above, as well as those not shown or described, are possible. Similarly, some features and sub-combinations are useful and may be employed without reference to other features and sub-combinations. Various aspects and examples have been described for illustrative and not restrictive purposes, and alternative aspects and examples will become apparent to readers of this patent.

The invention claimed is:

1. A dual-distribution lighting device comprising:
a forward-throw module comprising a first lighting element configured to provide directional light;
a wide-throw module comprising a second lighting element configured to provide light with a wide distribution of light;
a battery;
a temperature sensor operable to measure a temperature of the battery;
an interface element configured to receive an input; and
a processing device configured to perform, responsive to the input being received via the interface element, operations comprising one or more of:
receiving a temperature measurement from the temperature sensor;
responsive to determining that the temperature measurement exceeds a threshold, causing the forward-throw module to disable power to the first lighting element and causing the wide-throw module to disable power to the second lighting element; and
responsive to receiving an additional input from the interface element, perform one or more of (i) causing the forward-throw module to provide power to the first lighting element or (ii) causing the wide-throw module to provide power to the second lighting element.

2. The dual-distribution lighting device of claim 1, wherein:
the interface element is a button on the dual-distribution lighting device,
the processing device is further configured to perform additional operations comprising:
receiving input from the button, and
responsive to detecting a threshold number of pushes of the button within a threshold period of time, deactivating one of the forward-throw module or the wide-throw module and activate another of the forward-throw module or the wide-throw module.

3. The dual-distribution lighting device of claim 1, wherein:
the interface element is a button on the dual-distribution lighting device, and
the processing device is further configured to perform additional operations comprising:
receiving input from the button, and
responsive to detecting a push of the button of a certain duration, deactivating the one of the forward-throw module or the wide-throw module and activate another of the forward-throw module or the wide-throw module.

4. The dual-distribution lighting device of claim 1,
further comprising a communications interface operable to receive commands from an external device, and
wherein the processing device is further configured to perform, responsive to input from the communications interface, additional operations comprising:
deactivating one of the forward-throw module or the wide-throw module, and
activating another of the forward-throw module or the wide-throw module.

5. The dual-distribution lighting device of claim 1, further comprising:
a communications interface comprising a transceiver; and
a driver operable to drive the first and second lighting elements;
wherein the processing device is further configured to perform additional operations comprising:
receiving configuration parameters via the communications interface, the configuration parameters specifying a duty cycle of the driver, and
providing at least one signal to the forward-throw module or the wide-throw module to cause one or more of the first or second lighting elements to operate on the duty cycle.

6. The dual-distribution lighting device of claim 1, further comprising:
a communications interface comprising a transceiver;
a first driver operable to drive the first lighting element;
a second driver operable to drive the second lighting element;
wherein the processing device is further configured to perform additional operations comprising:
receiving configuration parameters via the communications interface, the configuration parameters specifying a first duty cycle of the first driver and a second duty cycle of the second driver, and perform operations comprising one or more of:
providing a first signal to the forward-throw module, causing the forward-throw module to operate the first lighting element on the first duty cycle, or
providing a second signal to the wide-throw module, the second signal causing the second lighting element to operate on the second duty cycle.

7. The dual-distribution lighting device of claim 1, wherein the processing device is further configured to perform additional operations comprising: responsive to detecting a loss of power, providing power from the battery to at least one of (i) the forward-throw module to operate the first lighting element, or (ii) the wide-throw module to the second lighting element.

8. The dual-distribution lighting device of claim 1, further comprising a light sensor operable to measure a light level, wherein the processing device is further configured to perform additional operations comprising: responsive to detecting that the light level has fallen below a threshold, providing power from a power source to at least one of (i) the forward-throw module to operate the first lighting element or (ii) the wide-throw module to the second lighting element.

9. The dual-distribution lighting device of claim 1,
wherein the processing device is further configured, responsive to the input being received via the interface element, to perform additional operations comprising:
deactivating the forward-throw module of the dual-distribution lighting device to cause the first lighting element to cease providing the directional light and activating the wide-throw module to cause the second lighting element to provide the wide distribution of light; and
deactivating the wide-throw module to cause the second lighting element to cease provide the wide distribution of light and activating the forward-throw module of the dual-distribution lighting device to cause the first lighting element to provide the directional light.

10. The dual-distribution lighting device of claim 1, further comprising a wireless transmitter that is configured to receive one or more of (i) a first signal or (ii) a second signal, wherein the processing device is configured to perform additional operations comprising:
providing a first signal to the forward-throw module, causing the forward-throw module to operate the first lighting element on a first duty cycle, or
providing a second signal to the wide-throw module, the second signal causing the second lighting element to operate on a second duty cycle.

11. The dual-distribution lighting device of claim 1, wherein the temperature sensor is configured to measure a temperature of a battery.

12. A method for operating a dual-distribution lighting device comprising:
detecting, at the dual-distribution lighting device, an input received via an interface element; and
responsive to the detection, perform operations comprising one or more of:
(i) deactivating a forward-throw module of the dual-distribution lighting device, the forward-throw module comprising a first lighting element that provides directional light, wherein deactivating the forward-throw module causes the first lighting element to cease providing the directional light, and activating a wide-throw module comprising a second lighting element that provides light with a wide distribution of light, wherein activating the wide-throw module causes the second lighting element to provide the wide distribution of light;
(ii) deactivating the wide-throw module, wherein deactivating the wide-throw module causes the second lighting element to cease providing the wide distribution of light, and activating the forward-throw module, wherein activating the forward-throw module causes the first lighting element to provide the directional light;
(iii) receiving a temperature measurement from a temperature sensor; and
(iv) responsive to determining that the temperature measurement exceeds a threshold, causing the forward-throw module to disable power to the first lighting element and cause the wide-throw module to disable power to the second lighting element.

13. The method of claim 12, further comprising:
receiving, at the dual-distribution lighting device, configuration parameters from a communications interface, the configuration parameters specifying a first duty cycle of a first driver and a second duty cycle of a second driver; and
operations comprising one or more of:
providing a first signal to the forward-throw module, causing the forward-throw module to operate the first lighting element on the first duty cycle; and
providing a second signal to the wide-throw module, the second signal causing the second lighting element to operate on the first duty cycle.

14. The method of claim 12, further comprising:
detecting a loss of power from an external power source; and
providing power from a battery to at least one of (i) the forward-throw module to operate the first lighting element or (ii) the wide-throw module to the second lighting element.

15. The method of claim 12, further comprising:
receiving a measure of light level from a light sensor; and
responsive to detecting that the measure of light level has fallen below a threshold, providing power to at least one of (i) the forward-throw module to operate the first lighting element, or (ii) the wide-throw module to the second lighting element.

16. A dual-distribution lighting device comprising:
a forward-throw module comprising a first lighting element configured to provide directional light;
a wide-throw module comprising a second lighting element configured to provide light with a wide distribution of light;
an interface element configured to receive an input;
a communications interface comprising a transceiver;
a driver operable to drive the first and second lighting elements; and
a processing device configured to perform operations comprising:
receiving, via the communications interface, configuration parameters specifying a first duty cycle and a second duty cycle,
providing one or more of (i) a first signal to the forward-throw module to configure the first lighting element to operate on the first duty cycle or (ii) a second signal to the wide-throw module to configure the second lighting element to operate on the second duty cycle, and
responsive to the input being received via the interface element, perform operations comprising one or more of:
(i) deactivating the forward-throw module of the dual-distribution lighting device to cause the first lighting element to cease providing the directional light and activating the wide-throw module to cause the second lighting element to provide the wide distribution of light on the second duty cycle; and
(ii) deactivating the wide-throw module to cause the second lighting element to cease provide the wide distribution of light and activating the forward-throw module of the dual-distribution lighting device to cause the first lighting element to provide the directional light on the first duty cycle.

17. The dual-distribution lighting device of claim 16, wherein:
the interface element is a button on the dual-distribution lighting device,
the processing device is configured to perform additional operations comprising:
receiving input from the button, and
responsive to detecting a threshold number of pushes of the button within a threshold period of time, deactivating one of the forward-throw module or the wide-throw module and activate another of the forward-throw module or the wide-throw module.

18. The dual-distribution lighting device of claim 16, wherein:
the interface element is a button on the dual-distribution lighting device, and
the processing device is further configured to perform additional operations comprising:
receiving input from the button, and
responsive to detecting a push of the button of a certain duration, deactivating the one of the forward-throw module or the wide-throw module and activate another of the forward-throw module or the wide-throw module.

19. The dual-distribution lighting device of claim 16, further comprising a light sensor operable to measure a light level, wherein the processing device is further configured to perform additional operations comprising:

responsive to detecting that the light level has fallen below a threshold, providing power from a power source to at least one of:
        (i) the forward-throw module to operate the first lighting element or
        (ii) the wide-throw module to the second lighting element.

20. The dual-distribution lighting device of claim 16, wherein the transceiver is a wireless transceiver or an infrared sensor, and the transceiver is configured to receive one or more of (i) a first signal or (ii) a second signal, and wherein the processing device is further configured to perform additional operations comprising:

providing a first signal to the forward-throw module, causing the forward-throw module to operate the first lighting element on a first duty cycle, or     providing a second signal to the wide-throw module, the second signal causing the second lighting element to operate on a second duty cycle.

\* \* \* \* \*